United States Patent
Pepper et al.

(10) Patent No.: US 9,935,707 B2
(45) Date of Patent: Apr. 3, 2018

(54) METHODS, SYSTEMS, AND COMPUTER READABLE MEDIA FOR PROVIDING TRAFFIC GENERATION OR FORWARDING DEVICE THAT COMPENSATES FOR SKEW BETWEEN ELECTRICAL LANES IN A MANNER THAT ALLOWS COHERENT DETECTION OF TRANSMITTED DATA

(71) Applicant: Ixia, Calabasas, CA (US)

(72) Inventors: Gerald Raymond Pepper, Newbury Park, CA (US); Michael D. Hutchison, Richmond (CA)

(73) Assignee: KEYSIGHT TECHNOLOGIES SINGAPORE (HOLDINGS) PTE. LTD, Singapore (SG)

( * ) Notice: Subject to any disclaimer, the term of this patent is extended or adjusted under 35 U.S.C. 154(b) by 0 days.

(21) Appl. No.: 15/284,109

(22) Filed: Oct. 3, 2016

(65) Prior Publication Data
US 2017/0099101 A1    Apr. 6, 2017

Related U.S. Application Data (60) Provisional application No. 62/236,063, filed on Oct. 1, 2015.

(51) Int. Cl.
*H04B 10/00* (2013.01)
*H04B 10/079* (2013.01)
(Continued)

(52) U.S. Cl.
CPC ......... *H04B 10/0795* (2013.01); *H04B 10/58* (2013.01); *H04B 10/616* (2013.01)

(58) Field of Classification Search
CPC ...... H04B 10/58; H04B 10/60; H04B 10/616; H04B 10/6165; H04B 10/69; H04B 10/697
See application file for complete search history.

(56) References Cited

U.S. PATENT DOCUMENTS

| | | | |
|---|---|---|---|
| 9,337,934 B1 * | 5/2016 | Agazzi | H04B 10/40 |
| 2015/0071642 A1 * | 3/2015 | Tanaka | H04B 10/2575 398/115 |

OTHER PUBLICATIONS

"25 Gigabit Ethernet," Wikipedia, https://en.wikipedia.org/wiki/25_Gigabit_Ethernet, pp. 1-3, accessed through wayback machine (Oct. 4, 2016).

(Continued)

*Primary Examiner* — Daniel Dobson (57) ABSTRACT

A method for transmitting and coherently detecting data transmitted over electrical lanes that experience different amounts of skew includes, at a traffic generation or forwarding device, self calibrating transmit and receive-side components of the traffic generation or forwarding device to account for skew between electrical lanes and setting per-electrical lane delays based on the calibration. Data to be transmitted to a network device is generated. The data to be transmitted is spread, using one of the transmit-side components, over a first number of electrical lanes. The data is multiplexed from the electrical lanes onto a second number of optical lanes, the second number being different from the first number. Data is transmitted to and received from the network device over the optical lanes. Transmitted data is reconstructed from the received data using the receive-side components.

25 Claims, 8 Drawing Sheets

(51) Int. Cl.
*H04B 10/58* (2013.01)
*H04B 10/61* (2013.01)
*H04J 14/00* (2006.01)

(56) References Cited

OTHER PUBLICATIONS

"25Gb Ethernet: Accelerated Network Performance and Lower Costs for Enterprise Data Center and Cloud Environments," White Paper, QLogic a Cavium Company, SN0530917-00 Rev. D, pp. 1-7 (2016).
"Enabling 100 Gigabit Ethernet Implementing PCS Lanes," Ixia, White Paper, 915-0909-01 Rev. C, pp. 1-11 (Jan. 2014).
Merritt, "Xilinx Marshals 10-Gbit serdes spec," EETimes, http://www.eetimes.com/document.asp?doc_id=1145377, pp. 1-3 (Dec. 13, 2002).

* cited by examiner

METHODS, SYSTEMS, AND COMPUTER READABLE MEDIA FOR PROVIDING TRAFFIC GENERATION OR FORWARDING DEVICE THAT COMPENSATES FOR SKEW BETWEEN ELECTRICAL LANES IN A MANNER THAT ALLOWS COHERENT DETECTION OF TRANSMITTED DATA

PRIORITY CLAIM

This application claims the priority benefit of U.S. Provisional Patent Application No. 62/236,063, filed Oct. 1, 2015, the disclosure of which is incorporated herein by reference in its entirety

TECHNICAL FIELD

The subject matter described herein relates to traffic generation devices. More particularly, the subject matter described herein relates to providing a traffic generation or forwarding device that compensates for skew between electrical lanes in a manner that allows coherent detection of transmitted data.

BACKGROUND

According to gigabit Ethernet standards, a serial bit stream of data to be transmitted is spread among electrical lanes and then among optical lanes before being transmitted over a network. For example, in 100 gigabit per second (Gb) Ethernet, serial data to be transmitted is spread over ten electrical lanes that each operate at 10 Gb. The data from the ten electrical lanes is multiplexed onto four optical lanes that each operate at 25 Gb. On the receive side, the data is received on the four optical lanes, demultiplexed into ten electrical lanes, and then serialized to form the transmitted serial bit stream.

To facilitate such multiplexing and demultiplexing of the data, the data transmitted over the electrical lanes is divided into virtual lanes, and, in some cases, the total number of virtual lanes is set to the least common multiple of the number of electrical and the number of optical lanes. Continuing with the 100 Gb Ethernet example, there are ten electrical lanes and four optical lanes. The least common multiple of four and ten is twenty. Accordingly, in 100 Gb Ethernet, that data transmitted on each of the ten electrical lanes is divided into two virtual lanes for a total of twenty virtual lanes.

Each of the virtual lanes is identified by a unique virtual lane marker. The transmitter periodically inserts virtual lane markers in data to be transmitted. The virtual lane markers are transmitted with the data over the electrical lanes. The data and virtual lane markers from the electrical lanes are multiplexed and transmitted over the optical lanes. Because the mapping between electrical and optical lanes is not fixed by gigabit Ethernet standards, bits from a given virtual lane can appear on any (but only one) optical lane. The virtual lane markers allow the physical component sublayer (PCS) at the receiver to identify which virtual lane bits are multiplexed onto each optical lane. The receiver places virtual lane bits for each virtual lane in individual first-in-first-out registers (FIFOs) and does not remove data from the FIFOs until the virtual lane markers for all of the virtual lanes have been received. Once the receiver determines that all of the virtual lane markers have been received, the receiver knows that the data following the virtual lane markers across the set of FIFOs represents the original transmitted bit stream and can extract or output the bits from the FIFOs. By waiting until all of the virtual lane markers have been received before extracting the data, the receiver removes the effect of skew on the received data.

The data rate or number of gigabits per second in a virtual lane is sometimes referred to as a virtual lane width. Thus, in 100 Gb Ethernet, each virtual lane has a virtual lane width of 5 Gb. In other standards, such as 25 Gb Ethernet, the virtual lane width can be said to be 25 Gb, since 25 Gb Ethernet includes a single electrical lane with no virtual lane markers.

When an Ethernet standard with different numbers of virtual lanes and virtual lane widths from a current or previous Ethernet standard is proposed, switch manufacturers or their respective chip vendors produce chips to implement the new standards. Before the switches and their associated chips can be used in live networks, the switches and chips must be tested for performance and functional compliance with the standard. One way to perform such testing is to send simulated traffic to the switch and monitor how the switch responds to the simulated traffic. In order to send simulated traffic to a switch and monitor its performance and functional compliance, transceiver chips that transmit and receive the simulated traffic with the appropriate number of virtual lanes and lane widths must be produced. When test interface chips for a particular standard are not yet available, it may be desirable to produce a test system with chipsets configured for one standard and its associated number of virtual lanes and virtual lane widths to test a next generation or other standard with different numbers of virtual lanes and different virtual lane widths. More generally, it may be desirable to produce a traffic generation system usable for test or non-test purposes with chipsets configured for one standard and its number of virtual lanes and lane widths to generate and send traffic that can be coherently detected by chipsets of a different standard with different numbers of virtual lanes and lane widths.

One problem with utilizing a chipset designed for one number of virtual lanes and associated lane widths to generate and send traffic to a device designed to operate at another number of virtual lanes and associated virtual lane widths is that the receiver must know precisely where bits will be allocated by the transmitter in order to properly reassemble the transmitted data. For example, it may be desirable to generate or forward traffic to a 25 Gb Ethernet switch. Unlike 100 Gb Ethernet, which includes twenty 5 Gb virtual lanes, each identified by a virtual lane marker, 25 Gb Ethernet consists of a single 25 Gb electrical lane with no virtual lane markers.

In one example, it may be desirable to use the existing 100 Gb Ethernet architecture to generate and coherently receive 25 Gb Ethernet traffic. However, because electrical components and the optical network itself generate skew between virtual lanes and 25 Gb Ethernet does not include virtual lane markers for identifying virtual lanes and removing such skew, modifications to the existing architecture may be required to perform such testing. In general, any time it is desirable to convert between standards with different virtual lane widths, transmitter and receiver modifications may be required to account for different amounts of skew between virtual lanes.

Accordingly, there exists a need for a device that compensates for skew between electrical lanes to allow coherent detection by a receiver.

SUMMARY

The subject matter herein includes methods, systems, and computer readable media for providing traffic generation or forwarding device that compensates for skew between electrical lanes in a manner that allows coherent detection of transmitted data. One method for transmitting and coherently detecting data transmitted over electrical lanes that experience different amounts of skew includes, at a traffic generation or forwarding device, self calibrating transmit and receive-side components of the network traffic generation or forwarding device to account for skew between electrical lanes and setting per-electrical lane delays based on the calibration. Data to be transmitted to a network device is generated. The data to be transmitted is spread, using one of the transmit-side components, over a first number of electrical lanes. The data is multiplexed from the electrical lanes onto a second number of optical lanes, the second number being different from the first number. Data is transmitted to and received from the network device over the optical lanes. Transmitted data is reconstructed from the received data using the receive-side components.

Although the terms transmit-side components and receive-side components are used herein to describe transmit and receive functionality of a traffic generation or forwarding device, it is understood that these terms may each include components with both transmit and receive functionality.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to using devices designed for one virtual lane width to transmit data at different virtual lane widths in a manner that allows coherent detection of transmitted data in the presence of variable skew introduced by transmit and receive-side components of a traffic generation or forwarding device. The subject matter described herein may be used to dynamically calibrate a traffic generation or forwarding device to account for varying amounts of skew between electrical lanes, even when virtual lane markers are not present in the transmitted data. Although examples of calibrating for skew in transmit and receive-side components when utilizing equipment designed for 100 Gb Ethernet to transmit and receive 25 Gb Ethernet and 50 Gb Ethernet will be presented, the subject matter described herein is not limited to these examples. The subject matter described herein may be used to self calibrate a traffic generation or forwarding device to account for skew between any number of electrical lanes and their associated lane widths.

Figure 1A:
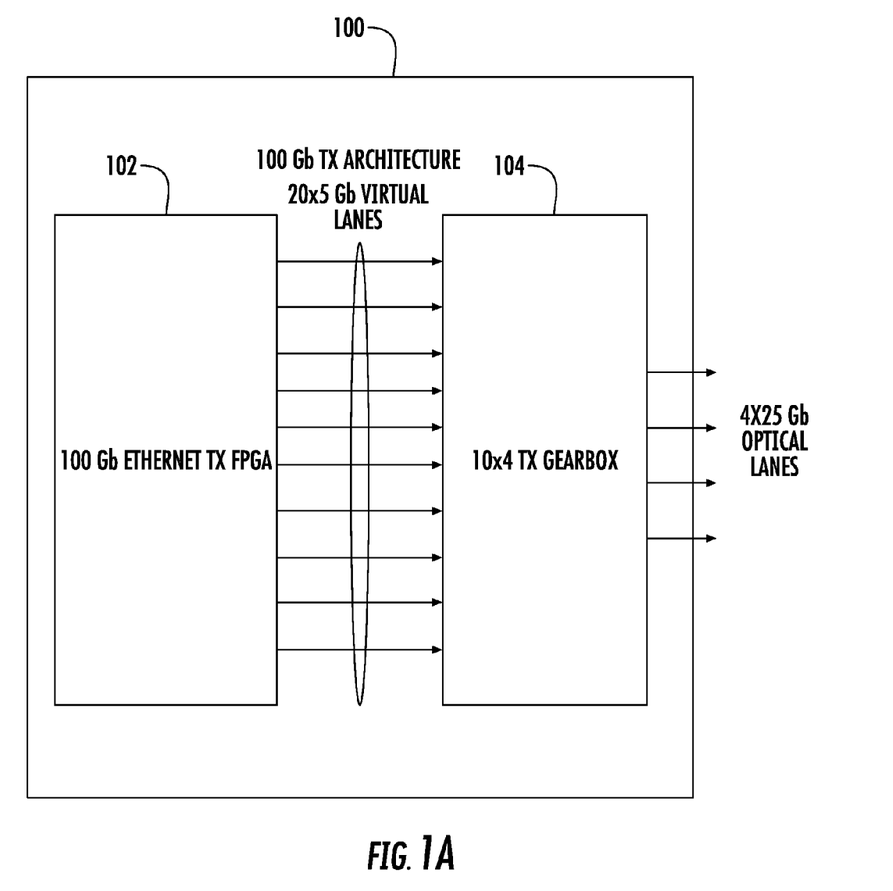
FIG. 1A is a block diagram illustrating a current 100 Gb Ethernet transmit-side architecture.

According to one aspect of the subject matter described herein, it may be desirable to calibrate a traffic generation or forwarding device to account for varying amounts of skew introduced by transmit and receive-side components of the traffic generation or forwarding device. FIG. 1A is a block diagram of a traffic generation or forwarding device illustrating transmit-side components of a 100 Gb Ethernet architecture. Referring to FIG. 1A, a traffic generation or forwarding device 100 may be network equipment test device or a non-test device, such as a switch, a router, a server, etc., with a chipset designed to send and receive network layer traffic in one or more virtual lanes having a defined virtual lane width. In the illustrated example, traffic generation or forwarding device 100 includes a 100 Gb Ethernet transmit (TX) FPGA 102 and a TX gearbox 104. 100 Gb Ethernet TX FPGA 102 spreads data across ten 10 Gb electrical lanes, each of which is divided into two 5 Gb virtual lanes, resulting in twenty 5 Gb virtual lanes. TX gearbox 104 multiplexes the twenty 5 Gb virtual lanes onto four 25 Gb optical lanes.

As stated above and as illustrated in the 100 Gb Ethernet architecture in FIG. 1A, the number of virtual lanes is the least common multiple of the number of electrical lanes and the number of optical lanes. For example, the number of electrical lanes is ten, the number of optical lanes is four, the least common multiple of ten and four is twenty, and thus there are twenty virtual lanes transmitted by TX FPGA 102. Using a number of virtual lanes that is the least common multiple of the number of electrical and optical lanes allows TX gearbox 104 to be implemented using a multiplexer that is not required to analyze the content of the data transmitted by TX FPGA 102 to do the multiplexing. That is, TX gearbox 104 bit interleaves the data from five virtual lanes onto each optical lane. The PCS layer at the receiver (not shown in FIG. 1A) uses virtual lane markers in the data to 1) identify to which virtual lane the received data belongs, and 2) remove skew between virtual lanes.

In the 100 Gb Ethernet architecture, when data is to be transmitted to a receiver, the data is spread in 8 byte blocks in order across the twenty 5 Gb virtual lanes, which are multiplexed onto the four 25 Gb optical lanes by TX gearbox 104. TX FPGA 102 periodically inserts the virtual lane markers in the data, which the receive side uses to reconstruct the data.

Figure 1B:
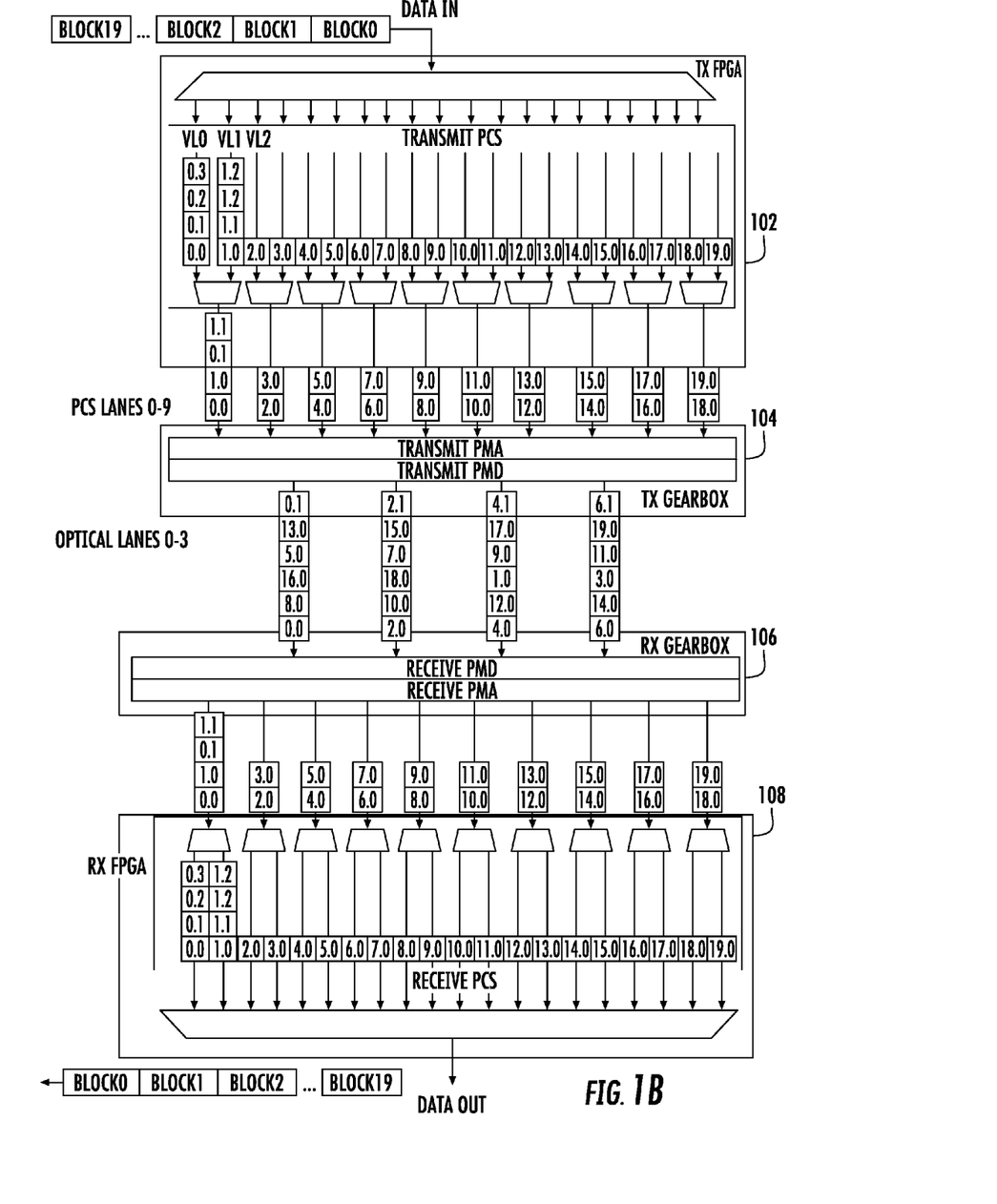
FIG. 1B is a block diagram illustrating electrical and optical lanes in a 100 Gb Ethernet architecture.

FIG. 1B illustrates the TX and RX architecture for 100 Gb Ethernet in more detail. In FIG. 1B, TX FPGA 102 spreads a continuous stream of input data across twenty virtual lanes numbered VL0 -VL19 in a round robin manner in which one data block is assigned to each virtual lane in order before proceeding to the next virtual lane. When virtual lane 19 is reached, the next input data block is assigned to virtual lane 0. The process of spreading input data block among virtual lanes continues as long as there is data to transmit.

The notation n.m in each of the rectangles in FIG. 1B denotes virtual lane n, bit m. In the illustrated example, virtual lanes 0 and 1 each include four bits of data (bits 0-3) to be transmitted to the receiver. Using round robin data distribution, virtual lane 0 would be filled with the first 66 bits (assuming 64/66b encoding) of the input data stream, which corresponds to data block 0 in FIG. 1B, followed by the filling of virtual lane 2 with the next 66 bits of data or block 1, etc.

TX FPGA 102 multiplexes or bit interleaves the bits from pairs of virtual lanes to form ten 10 Gb electrical lanes. The electrical lanes are transmitted in parallel over separate physical electrical interfaces from TX FPGA 102 to TX gearbox 104. In the illustrated example, electrical lane 0 contains bits from virtual lane 0 and virtual lane 1, electrical lane 1 contains bits from virtual lane 2 and virtual lane 3, etc. However, such in order multiplexing of the virtual lane bits onto electrical lanes is not required as long as every electrical lane contains bits from two and only two virtual lanes.

TX gearbox 104 bit multiplexes the virtual lanes transmitted over electrical lanes 0-9 to form optical lanes 0-3. In the 100 Gb architecture illustrated in FIG. 1B, each optical lane 0-3 contains bits from 5 of the virtual lanes. For example, optical lane 0 contains bits from virtual lanes 0, 2, 16, 5, and 13. The manner in which the virtual lanes are distributed among the optical lanes may not be known in advance of startup of the TX side components, and the virtual lane bits may encounter different amounts of skew by virtue of different processing paths on the transmit-side and different propagation delays of different optical wavelengths. Thus, it is not known in advance by the receive side which virtual lane bits will arrive on which optical lane or the skew between the virtual lanes.

RX gearbox 106 receives the data transmitted over optical lanes 0-3 and distributes the data among electrical lanes 0-9 on the receive-side by performing a round robin deinterleaving operation. For example, to demultiplex the data on optical lane 0, RX gearbox 106 simply distributes the bits from optical lane 0 into five different FIFOs in a round robin manner. The operation performed by RX gearbox 106 is a simple deinterleaving operation in which RX gearbox 106 is not required to analyze the contents (such as the virtual lane markers) of the data. RX gearbox 106 simply places the data from each optical lane into five different FIFOs without knowing or determining which virtual lane is present in each FIFO.

RX FPGA 108, which implements the PCS sublayer, analyzes the data in each FIFO and identifies which virtual lanes are present in each FIFO using the virtual lane markers. To remove the skew between virtual lanes, RX FPGA 108 waits until all of the virtual lane markers are detected in the FIFOs before extracting data from the FIFOs.

Even though in the example illustrated in FIG. 1B the virtual lanes are delivered by the RX gearbox 106 to RX FPGA 108 in the same order (from left to right in the drawing) in which the PCS lanes were transmitted by TX FPGA 102 to TX gearbox 104, this may not be the case in practice because the gearboxes have no knowledge of virtual lane markers and the order in which virtual lanes are multiplexed onto optical lanes is not standardized. It is the task of the PCS sublayer implemented by RX FPGA 108 to identify the virtual lane markers and reorder the data according to the order that the data was transmitted. It is also the task of the PCS sub-layer to remove skew between the virtual lanes so that the data output from the RX FPGA 108 is in the same order as the input data to TX FPGA 102.

The architecture illustrated in FIGS. 1A and 1B enables coherent data reconstruction by receive-side 100 Gb components because the number of virtual lanes is a multiple of the number of electrical and optical lanes and the virtual lane widths output by FPGA 102 and gearbox 104 are the same (5 Gb). However, if the virtual lane width desired to be transmitted to a network device and to receive-side components is different from that output by TX FPGA 102, there needs to be a mechanism to account for and calibrate for skew between virtual lanes introduced by transmit-side components, such as TX gearbox 104. For example, it may be desirable to use the output from TX gearbox 104 to produce a 25 Gb Ethernet data stream, which includes a single virtual lane of lane width 25 Gb. In 25 Gb Ethernet, the number of virtual lanes (one) is not a multiple of the number of electrical and optical lanes (ten and four) of TX gearbox 104. Thus, the fact that TX gearbox 104 performs a ten to four multiplexing operation means that the data from a single 25 Gb virtual lane will be split across multiple optical lanes. The optical lanes may experience differing amounts of skew and there are no virtual lane markers present in the single 25 Gb Ethernet lane usable by the receiver to remove such skew. Accordingly, calibration to remove the skew is required to enable coherent detection by the receiver.

Another problem caused by the lack of virtual lane markers in 25 Gb Ethernet data is that the receive-side components cannot use virtual lane markers to reconstruct the data. For example, in FIG. 1B, if a 25 Gb Ethernet data stream is transmitted through TX gearbox 104, it is not known how TX gearbox 104 will spread the 25 Gb Ethernet bits across the optical lanes. Without knowing the spreading mechanism of the TX gearbox 104, the receive-side components must try all possible combinations of ordering in addition to removing skew between virtual lanes.

Figure 2:
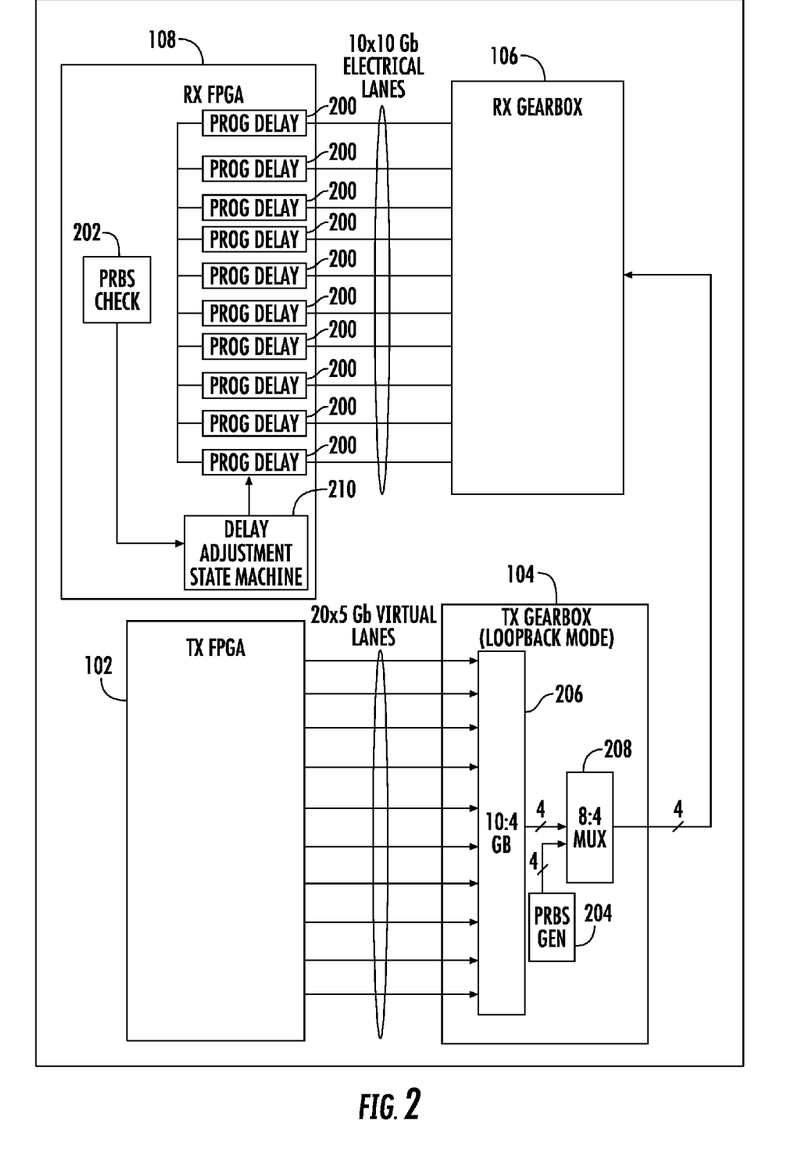
FIG. 2 is a block diagram illustrating a traffic generation or forwarding device configured to generate 25 Gb Ethernet traffic and including circuitry for self calibrating the traffic generation or forwarding device to compensate for skew introduced by receive-side components.

FIG. 2 illustrates an exemplary architecture of a traffic generation or forwarding device 100 according to an embodiment of the subject matter described herein for outputting data over four 25 Gb Ethernet optical lanes to a network device and receiving four 25 Gb Ethernet optical lanes from the network device. In FIG. 2, traffic generation or forwarding device 100 includes the same transmit and receive gearboxes 104 and 106 and FPGAs 102 and 108, illustrated in FIGS. 1A and 1B. However, the transmit and/or receive FPGAs 102 and 108 must be modified to account for skew and the absence of virtual lane markers in the transmitted data. A data generator (not shown in FIG. 2) may generate a continuous stream of 64/66b encoded blocks of data to be transmitted to the network device. TX FPGA 102 may spread or deserialize the data across ten 10 Gb electrical lanes. The virtual lane marker generation functionality of TX FPGA 102 may be disabled or modified, depending on the Ethernet standard for which traffic is being generated. For example, if traffic generation or forwarding device 100 is being used to generate 25 Gb Ethernet data, the virtual lane marker generation functionality of TX FPGA 102 may be disabled, as 25 Gb Ethernet does not use virtual lane markers. TX gearbox 104 bit interleaves or serializes 2.5 of the electrical lanes onto each of the optical lanes to form four 25 Gb Ethernet optical lanes, which would normally be transmitted to another network device. However, in FIG. 2, the transmit-side components of device 100 are connected to the receive components of device 100 for calibration purposes.

RX gearbox 106 receives data over the four 25 Gb optical lanes. RX gearbox 106 deserializes the data from the four optical lanes to produce ten electrical lanes. However, the data transmitted over the optical lanes does not include virtual lane markers. Thus, without some modification to account for skew, RX FPGA 108 would be unable to reassemble the transmitted data. Accordingly, a first aspect of the subject matter described herein includes a mechanism for calibrating for skew introduced by RX gearbox 106 and RX FPGA 108.

Transmit-Side Calibration

According to one aspect of the subject matter described herein, traffic generation or forwarding device 100 may perform a self calibration upon startup to compensate for skew introduced by transmit-side components 102 and 104. To calibrate for the skew introduced by transmit-side components 102 and 104, it is first necessary to calibrate for the skew introduced by receive-side components 106 and 108. In order to calibrate traffic generation or forwarding device 100 to account for the skew introduced by RX gearbox 106 and RX FPGA 108, programmable delay elements 200, one for each PCS lane, are located in RX FPGA 108. The purpose of programmable delay elements 200 is to set per-PCS lane programmable delays so that the delay eliminates skew between the PCS lanes. For example, if there were only two PCS lanes that were skewed by 10 ns from each other, the programmable delay element for the faster lane may be set to delay the lane by 10 ns. However, in the architecture illustrated in FIG. 2, there are ten electrical lanes, and the programmable delay elements 200 must be adjusted to remove the relative skew between all of the lanes.

In order to determine the proper combinations of delays to set in programmable delay elements 200, TX gearbox 104 is placed in loopback mode so that transmitted data can be checked by a pseudo-random bit sequence (PRBS) checker 202. A PRBS generator 204 located in TX gearbox 104 generates a pseudo-random bit sequence. The pseudo-random bit sequence is muxed with the output of 10:4 gearbox 206 by an 8:4 mux 208. The output from 8:4 mux 208 is transmitted to RX gearbox 106 over four 25 Gb Ethernet optical lanes.

RX gearbox 106 receives the data transmitted over the optical lanes and then demultiplexes the data onto ten electrical lanes. PRBS checker 202 implemented in RX FPGA 108 checks the data received over the electrical lanes to determine if the correct PRBS is present. If the correct PBRS is present, a delay adjustment state machine 210 sets the current delays of delay elements 200 to be the delays that will be used in operation during tests to remove skew introduced by RX gearbox 106 and RX FPGA 108. If the PRBS is not correct, delay adjustment state machine 210 adjusts programmable delays 200 for the electrical lanes and the process is repeated until the PRBS matches the transmitted PRBS. Once the PRBS matches, delay adjustment state machine 210 sets the programmable delays according to the matching values. The programmable delay settings obtained in this manner compensate for skew caused by RX gearbox 106 and RX FPGA 108.

One problem with checking for the correct PRBS is that without knowledge of how TX gearbox 104 maps electrical lanes to optical lanes, PRBS checker 202 and/or delay adjustment state machine 210 must check for all possible combinations of mappings to determine whether the PRBS matches the transmitted PRBS. The checking of all possible electrical lane to optical lane mappings in combination with the possible combinations of skew can cause an undesirably long time to find the delay values for programmable delays 200. In order to alleviate this difficulty, electrical to optical lane mapping pattern of TX gearbox 104 can be determined automatically by traffic generation or forwarding device 100 before setting programmable delays 200 by transmitting known bit sequences from TX FPGA 102 through TX gearbox 104 and analyzing the output of TX gearbox 104. The output will indicate which electrical lanes are mapped onto which optical lane. With this knowledge, PRBS checker 202 and delay adjustment state machine 210 only need to be configured to set the proper delay values to remove skew, rather than considering all possible combinations of electrical to optical lane mapping.

Figure 3:
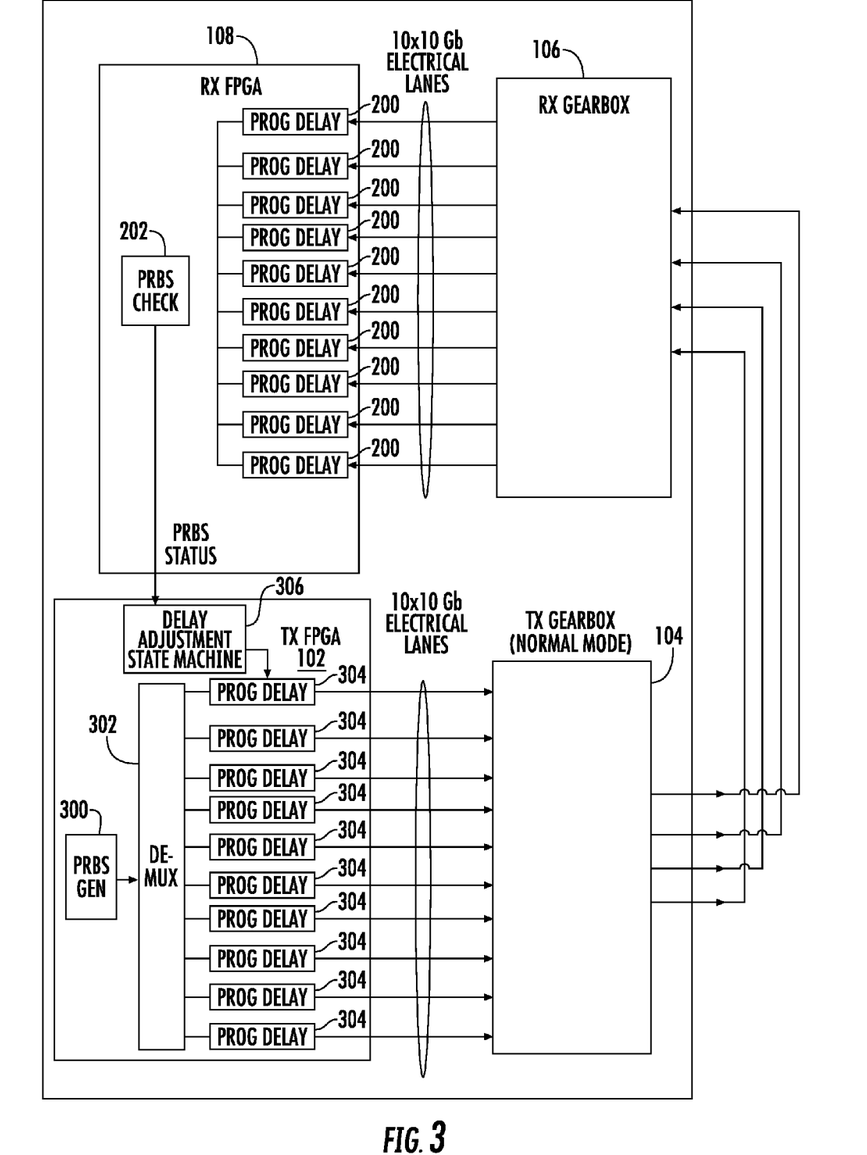
FIG. 3 is a block diagram illustrating a traffic generation or forwarding device configured to generate 25 Gb Ethernet traffic and including circuitry for self calibrating the traffic generation or forwarding device to compensate for skew introduced by transmit-side components.

Once the programmable delays for the receive-side components are set, traffic generation or forwarding device 100 may perform a self calibration to compensate for skew caused by transmit-side components. FIG. 3 illustrates exemplary components of traffic generation or forwarding device 100 for calibrating for skew introduced by transmit-side components. In FIG. 3, a PRBS generator 300 located in TX FPGA 102 generates a serial pseudo-random bit sequence which is demultiplexed by demultiplexer 302 for transmission over the 10 transmit-side electrical lanes. To account for skew introduced by TX FPGA 102 and TX gearbox 104, TX FPGA 102 includes programmable delay elements 304, one for each electrical lane, whose delay values can be set programmatically to compensate for skew introduced by transmit-side components.

In order to determine the proper amount of programmable delay to set in each programmable delay element 304, programmable delay elements 304 are initialized to a predetermined initial delay value (such as zero), and PRBS generator 300 generates a PRBS to be transmitted to the receive-side components. The PRBS is spread and transmitted over the 10 transmit-side electrical lanes, and each lane experiences the delay set by its programmable delay element 304.

TX gearbox 104 multiplexes the PRBS data received over the electrical lanes over the optical lanes and transmits the multiplexed PRBS data to RX gearbox 106. RX gearbox 106 demultiplexes the data received on the optical lanes onto ten receive-side electrical lanes. PRBS checker 202 checks the PRBS received over the electrical lanes to determine whether the PRBS matches the transmitted PRBS. PRBS checker 202 reports the status to delay adjustment state machine 306 implemented on transmit-side FPGA 102. If the PRBS matches the transmitted PRBS, delay adjustment state machine 306 sets the programmable delays 304 to the values that resulted in the correct PRBS. If the received PRBS is not equal to the transmitted PRBS, delay adjustment state machine 306 adjusts the programmable delays and the process is repeated. Once the correct PRBS is received and the delay values of programmable delays 304 are set, the delays compensate for skew introduced by TX FPGA 102 and TX gearbox 104.

Receive-Side Calibration

In the first phase of transmit-side calibration described above with respect to FIG. 2, TX gearbox 104 operates in loopback mode and sets programmable delays 200 in RX FPGA 108 to remove skew caused by RX FPGA 108 and RX gearbox 106. In the second phase of transmit-side calibration described above with respect to FIG. 3, traffic generation or forwarding device sets programmable delays 304 in TX FPGA 102 to remove skew between electrical lanes introduced by TX FPGA 102 and TX gearbox 104. The calibration of transmit-side components only needs to be performed once at startup of device 100. However, receive-side components must be calibrated to remove skew each time a link flap occurs, i.e., when a link goes out of and comes back into service. Because receive-side components must be calibrated any time a link goes out of and into service, they must be calibrated based on actual data, for example, 25 Gb Ethernet data, rather than using test patterns, such as PRBS patterns.

According to one aspect of the subject matter described herein, traffic generation or forwarding device 100 performs another self calibration to set programmable delays 200 for receive-side components to remove skew between virtual lanes by analyzing the received data after a link comes back into service for link fault signaling. Link fault signaling is signaling that occurs after a link fault on a PCS or electrical lane. If the only signaling on a given PCS electrical lane is link fault signaling, and that signaling is properly detected, then it is known that the electrical lanes are properly aligned.

In checking for the link fault signaling after a link flap, the receive-side components that perform the decoding may use the knowledge of ordering by the TX gearbox 104 learned during transmit-side calibration. Assuming that ordering is known, one method for calibrating receive-side components using link fault signaling is to set the programmable delay for each electrical lane to a predetermined value, check for proper link fault signaling, and continually adjust the delays until proper link fault signaling is detected. Such a brute force method would eventually result in the proper delays being set to eliminate skew between electrical lanes. However, such a method may take an undesirably long time to converge to the proper delay values. Accordingly, in one embodiment, receive-side calibration uses the fact that received data is in 66 bit blocks with the control bits occurring every 66 bits to properly decode the data.

Figure 4:
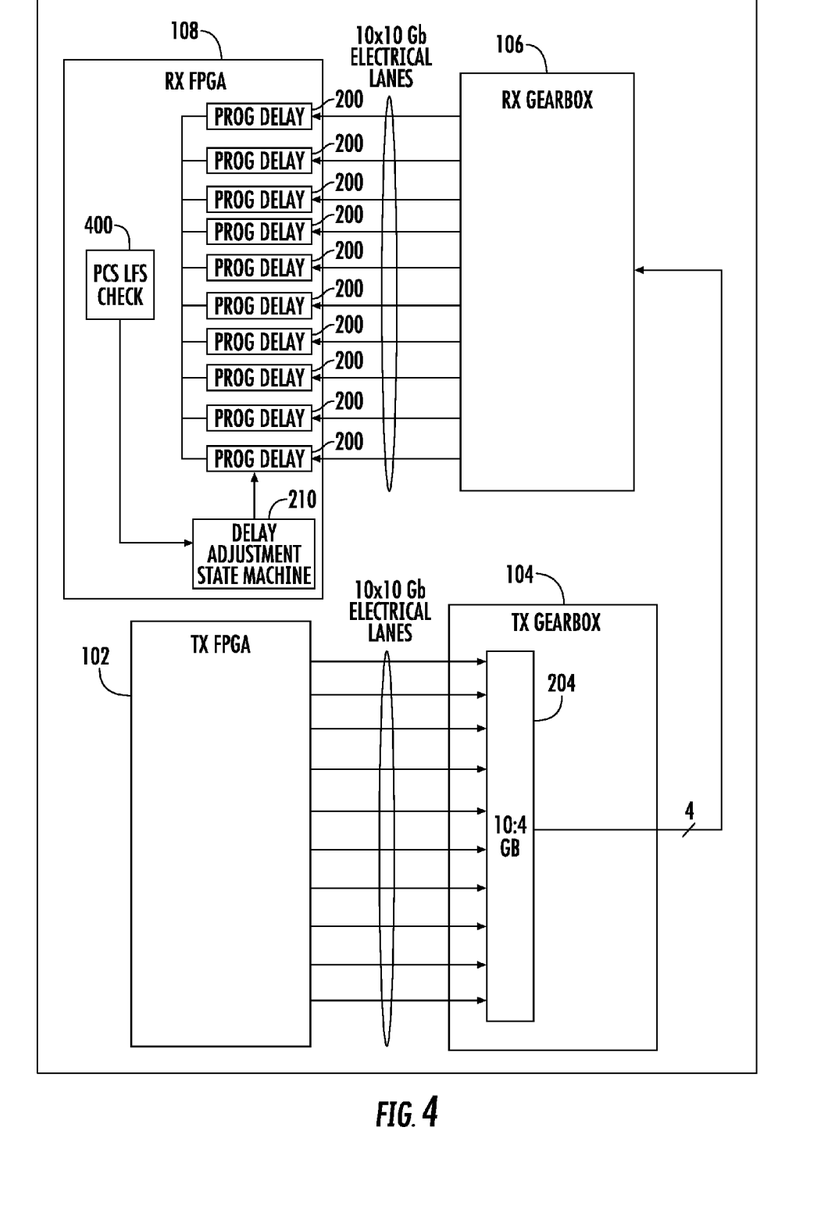
FIG. 4 is a block diagram exemplary components of a traffic generation or forwarding device for self calibrating receive-side components after a link flap.

FIG. 4 is a block diagram of exemplary components of RX FPGA 108 for self calibrating or setting programmable delays 200 to eliminate skew between electrical lanes. Referring to FIG. 4, data incoming to RX FPGA 108 on a particular electrical lane passes through one of programmable delay elements 200, which may be initialized to the value set during initial calibration. Delay adjustment state machine 210 sets the values of the programmable delays in response to checking by physical component sublayer (PCS) link fault signaling (LFS) checker 400. PCS LFS checker 400 checks for remote fault, local fault, and idle messages for each of the PCS lanes. If the only data received on the PCS lanes properly decodes to such link fault signaling, then the programmable delay values are set correctly. If the data on the electrical lanes does not properly decode to link fault signaling, delay adjustment state machine 210 may adjust the skew between the lanes and the check may be repeated.

When checking for the link fault signaling on a given electrical lane, it is known that the control bits that identify each link fault message reoccur every 66 bits because the messages are carried in 66-bit blocks of data. It is also known that TX gearbox 104 places data from 2.5 of the electrical lanes onto each optical lane. Thus, when searching for link fault signaling, PCS LFS checker 400, for receive-side electrical lane 0, knows that the control bits that identify a link fault signaling message will appear in the first two bits of electrical lane 0. The next two control bits on receive-side electrical lane 0 will occur 66 bits after the first two control bits, and these control bits will be a link fault signaling message for another transmit-side electrical lane. The next two control bits on receive-side electrical lane 0 will occur 66 bits later and will be for another electrical lane. This lane will be the split lane, so the next control bits for receive-side electrical lane 0 will occur 33 bits later and will be for the first transmit electrical lane. Similarly repeating patterns will occur on each receive-side electrical lane. PCS LFS checker 400 may utilize the knowledge of these repeating patterns when attempting to decode the link fault signaling, thus reducing the processing time for setting the programmable delays 200 to the correct value to compensate for skew after a link fault.

Once programmable delays 200 are set, skew caused by receive-side components 106 and 108 after a link fault will be removed. Accordingly, data can be transmitted by TX FPGA 102 and TX gearbox 104 to a network device. The network device may return the data to RX gearbox 106 and RX FPGA 108. Any skew between electrical lanes will be caused by the network device, rather than device 100. Such skew can be measured to determine whether the skew is within the tolerance allowed by the particularly standard.

Figure 5:
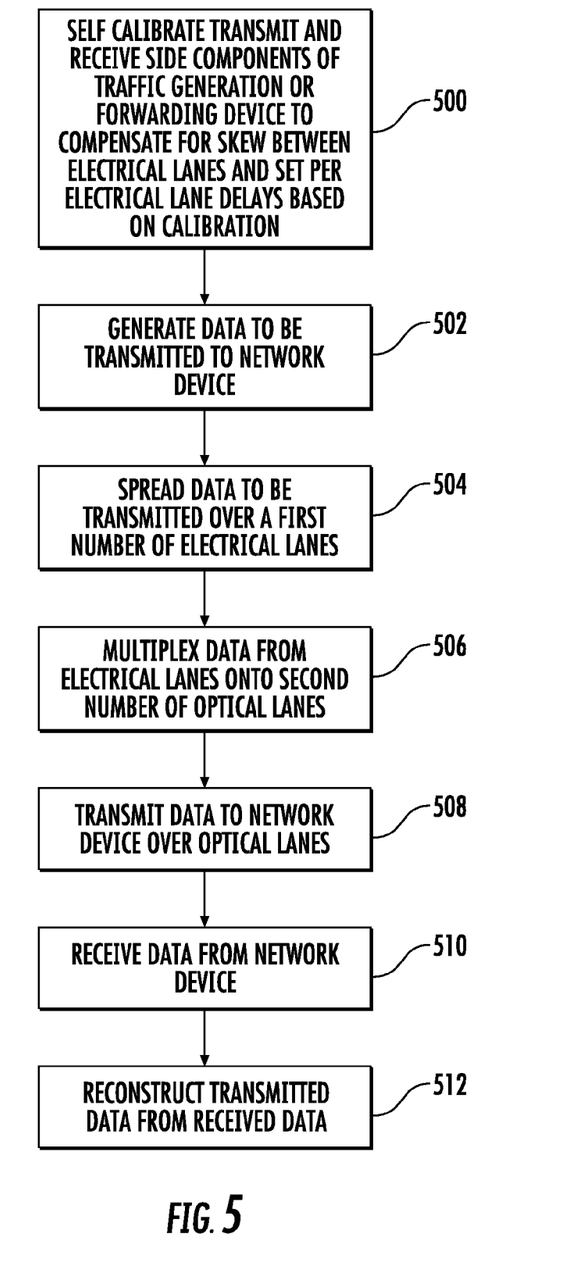
FIG. 5 is a flow chart illustrating exemplary overall steps for calibrating and using a traffic generation or forwarding device to transmit 25G Ethernet data to a network device.

FIG. 5 is a flow chart illustrating exemplary overall steps for utilizing traffic generation or forwarding device to transmit and coherently detect data from a network device. Referring to FIG. 5, in step 500, transmit and receive-side components calibrate themselves to compensate for skew between electrical lanes, and per-electrical lane delays are set based on the calibration. For example, as stated above, an initial calibration may be performed where programmable delays are set in RX FPGA 108 to compensate for skew introduced by RX FPGA 108 and RX gearbox 106. Once this calibration is performed, programmable delays may be set in TX FPGA 102 to compensate for skew caused by TX FPGA 102 and TX gearbox 104. The initial calibration may be performed by transmitting pseudo-random bit sequences to RX FPGA 108 and checking for the correct value.

After the initial calibration, calibration for skew caused by receive-side components may be performed any time a link flap occurs. The calibration after a link flap may be performed by analyzing received data for link fault signaling. If proper link fault signaling is detected, then the receive-side components of device 100 are properly calibrated. If link fault signaling is not present, programmable delays may be set and the received data may be reanalyzed until proper link fault signaling is detected.

Once the self calibration is performed, in step 502, data is generated for transmission to a network device. In one example, the data may be a continuous stream of 64/66b encoded serial data. In another example, a different data encoding scheme may be used. In step 504, the data is spread using one of the transmit-side components to be transmitted over a first number of electrical lanes. For example, TX FPGA 102 may spread the serial bit stream to be transmitted over ten electrical lanes on a per 64/66b block basis as described above with respect to FIG. 1B. Each of the electrical lanes may operate at a predetermined bit rate, such as 10 Gb. In step 506, the data from the electrical lanes is multiplexed onto a second number of optical lanes. The second number may be different from the first number. For example, data from the ten electrical lanes may be multiplexed onto four optical lanes, each of which operates at 25 Gb.

In step 508, the data is transmitted over the optical lanes to a network device. The network device may be a network switch implementing a particular Ethernet standard, such as 25 Gb Ethernet, 50 Gb Ethernet, or other suitable layer 2 data communications protocol. In step 510, the data is received from the network device. The data may be four 25 GB Ethernet optical lanes, in one example. In step 512, transmitted data is reconstructed from the received data. For example, RX gearbox 106 may receive data from the network device over the optical lanes and demultiplex the data to ten electrical lanes. RX FPGA 108 may receive the data over the ten electrical lanes and reassemble the data into a serial bit stream. Because the programmable delays are set to remove skew, any skew between electrical lanes is caused by the network device and can be quantified as such.

It should be noted that in a test scenario, the data received from the network device may be the same data that was transmitted to the network device. In a non-test scenario, the data received from the network device may be different from the data transmitted to the network device. Using the calibration methods described herein, coherent detection by the traffic generation or forwarding device can be achieved in either case.

50 Gigabits Per Second

As stated above, the methods described herein are not limited to generating 25 Gb Ethernet traffic. The subject matter described herein may be used to calibrate for skew in generating traffic at any desired data rate and/or lane width. In one example, the subject matter described herein may be used to generate and coherently detect 50 Gb Ethernet traffic. In generating 50 Gb Ethernet traffic, the transmit-side calibration may be performed as indicated above by transmitting a pseudo-random bit sequence from TX gearbox 104 in loopback mode to RX FPGA 108 and adjusting programmable delays 200 until the skew caused by RX gearbox 106 and RX FPGA 108 is removed. Once the skew introduced by the receive-side components is compensated for, the calibration for skew introduced by transmit-side components may be performed as described above with respect to FIG. 3.

Figure 6:
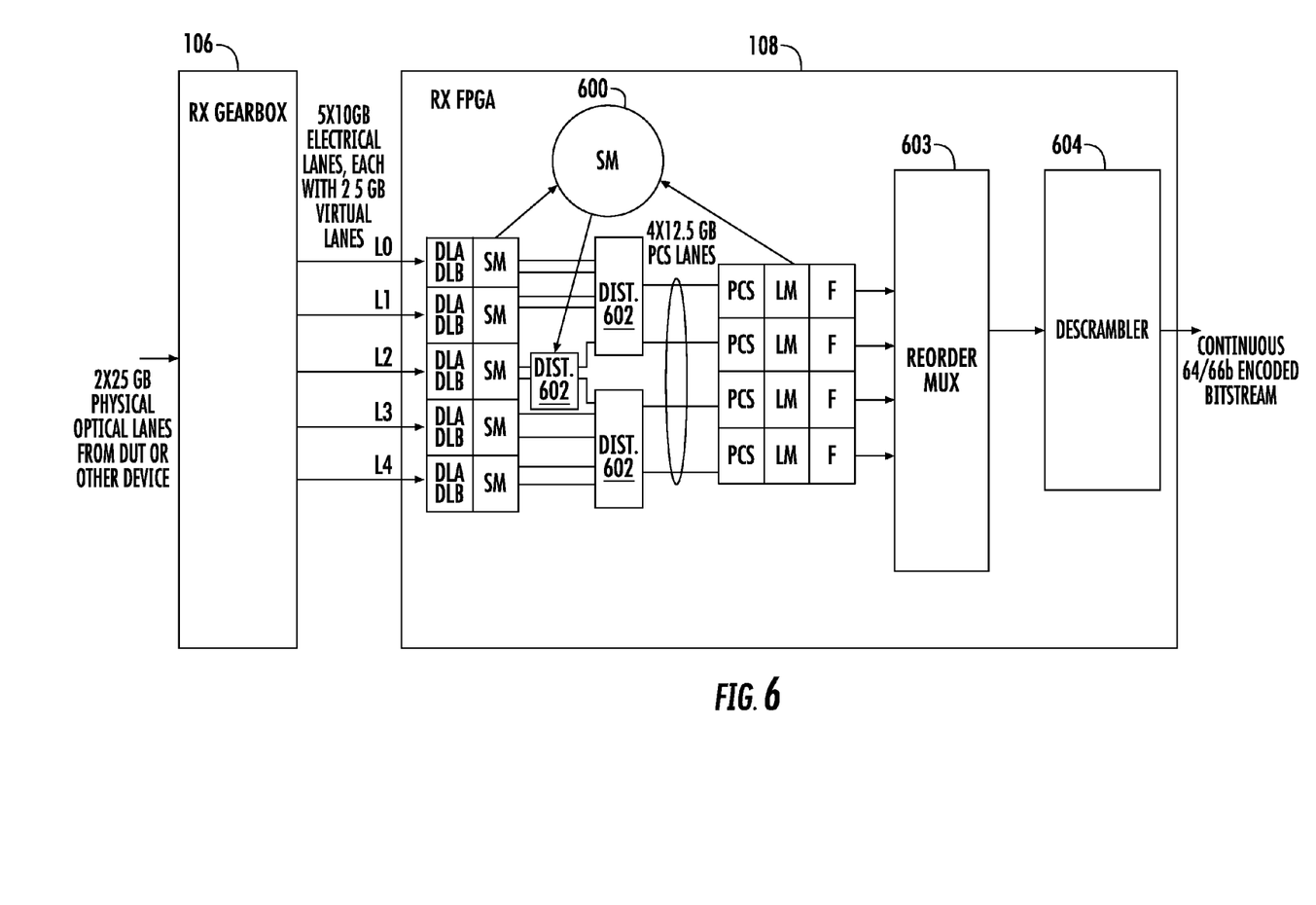
FIG. 6 is a diagram illustrating an exemplary architecture for a receive FPGA for self calibrating for skew between electrical lanes for the 50 Gb Ethernet architecture.

In order to perform receive-side calibration for compensating for skew for 50 Gb Ethernet traffic after a link flap, it can be recognized that 50 Gb Ethernet is over-clocked 40 Gb Ethernet. 40 Gb Ethernet consists of four 10 Gb optical lanes. Thus, 50 Gb Ethernet consists of four 12.5 Gb optical lanes that transmitted by TX gearbox 104 and received by RX gearbox 106. RX gearbox 106 deinterleaves the 4×12.5 Gb optical lanes onto ten electrical lanes without analyzing the content of the data. FIG. 6 is a diagram illustrating an exemplary architecture for RX FPGA 108 for compensating for skew between electrical lanes for the 50 Gb Ethernet architecture. Referring to FIG. 6, RX gearbox 106 receives a 50 Gb Ethernet optical signal from a DUT or any other device capable of sending a 50 Gb Ethernet signal. The 50 Gb Ethernet signal is divided into two physical 25 Gb optical lanes. Each 25 Gb optical lane is divided into 5 5 Gb virtual lanes identified by unique virtual lane markers. However, it is not known how the virtual lanes are divided among the optical lanes.

RX gearbox 106 performs bit deinterleaving and separates the 2 25 Gb optical lanes into 5 10 Gb electrical lanes, where each of the 10 Gb electrical lanes includes 2 5 Gb virtual lanes and provides the 10 5 Gb virtual lanes to RX FPGA 108. Because the skew between the virtual lanes is not known, RX FPGA 108 includes programmable delay elements labeled DLA and DLB for compensating for the skew for each virtual lane. In order to determine the amount of delay to apply, a state machine SM for each virtual lane looks for sync bits, which appear at the beginning of each 64/66b encoded signal for each virtual lane. If sync bits are detected, the state machine SM for each virtual lane begins looking for a virtual lane marker (LM). If sync bits and a virtual lane marker are detected, the programmable delays for the virtual lanes are correct, and a controlling state machine 600 sets the programmable delays DLA and DLB to the delay values that resulted in detection of the sync bits and the virtual lane markers. If the sync bits and the virtual lane markers are not detected, the delay values are not correct, and controlling state machine 600 sets the delays DLA and DLB to new values. This process is repeated until the delay values DLA and DLB are set for each virtual lane pair. Once the delay values that result in coherent detection of the 10 5 Gb virtual lanes, which are bitmapped onto 4 12.5 Gb PCS lanes by distributors 602, the 4 12.5 Gb PCS lanes are output to reorder mux 603 and descrambler 604, which perform PCS reordering and descrambling to produce a continuous 64/66b encoded bitstream.

Figure 7:
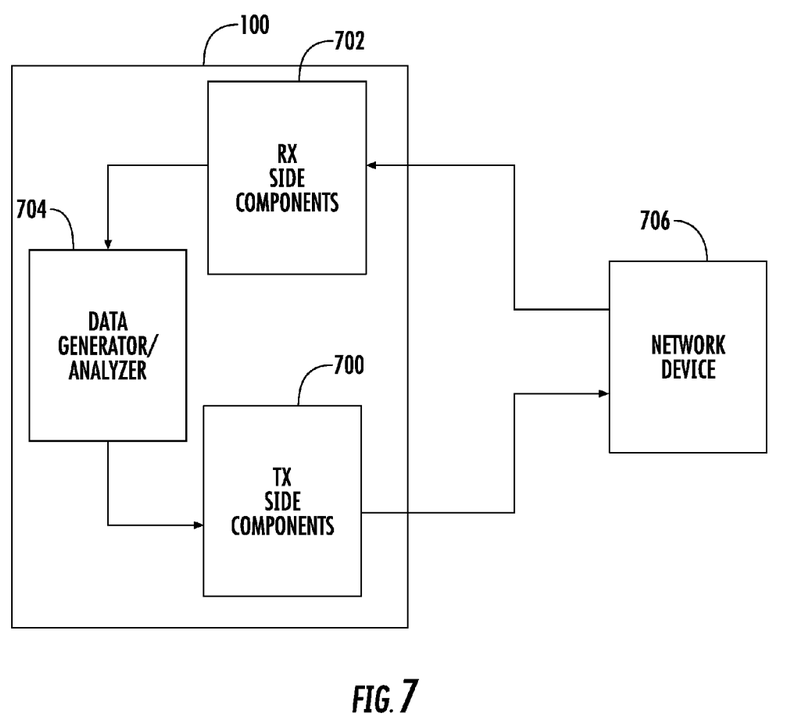
FIG. 7 is a block diagram illustrating an exemplary overall architecture for testing a network device.

FIG. 7 is a block diagram illustrating an exemplary overall architecture for testing a network device according to an embodiment of the subject matter described herein. Referring to FIG. 7, traffic generation or forwarding device 100 includes transmit-side components 700 and receive-side components 702 that perform self calibration as described above to compensate for skew between electrical lanes generated by device 100. Transmit-side components 700 may include TX FPGA 102 and TX gearbox 104 as described above. Transmit side components 700 may be at least partially configured to transmit data according to one Ethernet standard, such as 100 Gb Ethernet. Receive-side components 702 may include RX FPGA 108 and RX gearbox 106 as described above. Receive side components 702 may be at least partially configured to receive and coherently detect data according to one Ethernet standard, such as 100 Gb Ethernet. However, with self calibration as described herein, transmit side components 700 may be configured to transmit and receive side components 702 may be configured to coherently detect data transmitted according to a plurality of different Ethernet standards, such as 25 Gb Ethernet or 50 Gb Ethernet.

A data generator/analyzer 704 generates data to be transmitted to network device 706 and analyzes data received from network device 706. The data is divided or spread among electrical lanes, multiplexed onto optical lanes at the desired data rate, and transmitted to network device 706. The data is transmitted from network device 706 to receive-side components 702 of network device 100. Receive-side components 702 reconstruct the transmitted data from the received data without the requirement that the received data include virtual lane markers. Data generator/analyzer 704 analyzes the reconstructed data to determine measurements of skew, latency, jitter, and/or other metrics.

Because transmit and receive-side components 700 and 702 perform self calibration to account for skew generated by device 100, any detected skew is caused by network device 706 or the links between traffic generation or forwarding device 100 and network device 706. Because traffic generation or forwarding device self calibrates for skew between electrical lanes, coherent detection of transmitted data can be achieved without using virtual lane markers (and even in the absence of virtual lane markers. Traffic generation or forwarding device 100 can thus use gearboxes and FPGAs that are primarily designed to generate and coherently detect Ethernet traffic for one standard, such as 100 Gb Ethernet, to generate and coherently detect Ethernet traffic according to another standard, such as 25 Gb Ethernet or 50 Gb Ethernet. Such flexibility improves the functionality of a traffic generation or forwarding device by enabling a device with chips designed to communicate with network equipment that conforms to one Ethernet standard to communicate with different network equipment conforming to different Ethernet standards.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for transmitting and coherently detecting data transmitted over electrical lanes that experience different amounts of skew, the method comprising:
in a traffic generation or forwarding device:
self calibrating transmit and receive-side components of the traffic generation or forwarding device to account for skew between electrical lanes and setting per-electrical lane delays based on the calibration;
generating or receiving data to be transmitted to a network device;
spreading, using one of the transmit-side components, the data to be transmitted over a first number of electrical lanes;
multiplexing the data from the electrical lanes onto a second number of optical lanes, the second number being different from the first number;
transmitting the data to the network device over the optical lanes.
receiving the data from the network device; and
reconstructing transmitted data from the received data using the receive-side components, wherein the traffic generation or forwarding device comprises a network equipment test device and wherein the network device comprises a device under test.

2. The method of claim 1 wherein self calibrating the transmit and receive-side components includes performing an initial calibration of the transmit and receive-side components at startup of the traffic generation or forwarding device.

3. The method of claim 2 wherein performing the initial calibration includes calibrating the receive-side components to account for skew introduced by the receive-side components and calibrating the transmit-side components to account for skew introduced by the transmit-side components.

4. The method of claim 3 wherein calibrating the receive-side components to account for skew introduced by the receive-side components includes:
generating a bit sequence using one of the transmit-side components;
spreading the bit sequence to be transmitted over the electrical lanes;
multiplexing the bit sequence from the electrical lanes onto the optical lanes;
transmitting the bit sequence to the receive-side components over the optical lanes;
receiving the bit sequence at the receive-side components over the optical lanes and distributing the bit sequence received over the optical lanes among electrical lanes;
adding delays to the bit sequence received over the electrical lanes;
attempting to detect the transmitted bit sequence from the bit sequence received over the electrical lanes;
in response to failing to detect the transmitted bit sequence, changing the delays and repeating the transmitting of the bit sequence or a different bit sequence; and
in response to successfully detecting the transmitted bit sequence, setting the per-electrical lane delays to values that correspond to successful detection of the transmitted bit sequence.

5. The method of claim 4 wherein the transmitted bit sequence comprises a pseudo-random bit sequence (PRBS).

6. The method of claim 3 wherein calibrating the transmit-side components to account for skew introduced by the transmit-side components includes:
generating a bit sequence using transmit-side components;
spreading the bit sequence to be transmitted over the electrical lanes;
adding delays to the bit sequence on a per-electrical lane basis at the transmit-side components;
multiplexing the bit sequence from the electrical lanes onto the optical lanes;
transmitting the bit sequence to the receive-side components over the optical lanes;
checking the bit sequence received by the receive-side components;
determining whether the bit sequence received by the receive-side components matches the transmitted bit sequence; and
in response to determining that the received bit sequence matches the transmitted bit sequence, setting the per-electrical lane delays to delay values that resulted in the matching.

7. A method for transmitting and coherently detecting data transmitted over electrical lanes that experience different amounts of skew, the method comprising:
in a traffic generation or forwarding device:
self calibrating transmit and receive-side components of the traffic generation or forwarding device to account for skew between electrical lanes and setting per-electrical lane delays based on the calibration;
generating or receiving data to be transmitted to a network device;
spreading, using one of the transmit-side components, the data to be transmitted over a first number of electrical lanes;
multiplexing the data from the electrical lanes onto a second number of optical lanes, the second number being different from the first number;
transmitting the data to the network device over the optical lanes,
receiving the data from the network device; and
reconstructing transmitted data from the received data using the receive-side components, wherein self calibrating the transmit and receive-side components includes calibrating the receive-side components to account for skew between electrical lanes after a link fault.

8. The method of claim 7 wherein calibrating the receive-side components includes using link fault signaling in data received after a link fault to calibrate the receive-side components after the link fault.

9. The method of claim 8 wherein using link fault signaling to calibrate the receive-side components includes:

adding delays on a per electrical lane basis at the receive-side components to the data received after the link fault;

attempting to detect link fault signaling in the data received after the link fault at the receive-side components;

in response to detecting link fault signaling, setting the per-electrical lane delays to delay values that resulted in successful detection of the link fault signaling; and in response to failing to detect the link fault signaling, changing the delays at the receive-side components and reattempting to detect the link fault signaling.

10. The method of claim 1 wherein the first number of electrical lanes is ten, the second number of optical lanes is four, and transmitting the data to the network device over the optical lanes includes transmitting the data over four 25 gigabit Ethernet optical lanes.

11. The method of claim 1 wherein the first number of electrical lanes is ten, the second number of optical lanes is four, wherein transmitting the data to the network device over the optical lanes includes transmitting the data over four 12.5 gigabit optical lanes, and wherein detecting the data includes assembling the 12.5 gigabit optical lanes into a stream of 50 gigabit Ethernet data.

12. The method of claim 7 wherein the traffic generation or forwarding device comprises non-test device.

13. A system for transmitting and coherently detecting data transmitted over electrical lanes that experience different amounts of skew, the system comprising:

a traffic generation or forwarding device;

transmit-side components of the traffic generation or forwarding device for generating data to be transmitted to a network device, spreading, using one of the transmit-side components, the data to be transmitted over a first number of electrical lanes, multiplexing the data from the electrical lanes onto a second number of optical lanes, the second number being different from the first number, and transmitting the data to the network device over the optical lanes; and receive-side components of the traffic generation or forwarding device for receiving data from the network device and for reconstructing transmitted data from the received data, wherein the transmit and receive-side components are configured to self calibrate to account for skew between electrical lanes and to set per-electrical lane delays based on the calibration, wherein the traffic generation or forwarding device comprises a network equipment test device and wherein the network device comprises a device under test.

14. The system of claim 13 wherein self calibrating the transmit and receive-side components includes performing an initial calibration of the transmit and receive-side components at startup of the traffic generation or forwarding device.

15. The system of claim 14 wherein performing the initial calibration includes calibrating the receive-side components to account for skew introduced by the receive-side components and calibrating the transmit-side components to account for skew introduced by the transmit-side components.

16. The system of claim 15 wherein calibrating the receive-side components to account for skew introduced by the receive-side components includes:

generating a bit sequence using one of the transmit-side components;

spreading the bit sequence to be transmitted over the electrical lanes;

multiplexing the bit sequence from the electrical lanes onto the optical lanes;

transmitting the bit sequence to the receive-side components over the optical lanes;

receiving the bit sequence at the receive-side components over the optical lanes and distributing the bit sequence received over the optical lanes among electrical lanes;

adding delays to the bit sequence received over the electrical lanes;

attempting to detect the transmitted bit sequence from the bit sequence received over the electrical lanes;

in response to failing to detect the transmitted bit sequence, changing the delays and repeating the transmitting of the bit sequence or a different bit sequence; and in response to successfully detecting the transmitted bit sequence, setting the per-electrical lane delays to values that correspond to successful detection of the transmitted bit sequence.

17. The system of claim 16 wherein the transmitted bit sequence comprises a pseudo-random bit sequence (PRBS).

18. The system of claim 15 wherein calibrating the transmit-side components to account for skew introduced by the transmit-side components includes:

generating a bit sequence using transmit-side components;

spreading the bit sequence to be transmitted over the electrical lanes;

adding delays to the bit sequence on a per-electrical lane basis at the transmit-side components;

multiplexing the bit sequence from the electrical lanes onto the optical lanes;

transmitting the bit sequence to the receive-side components over the optical lanes;

checking the bit sequence received by the receive-side components;

determining whether the bit sequence received by the receive-side components matches the transmitted bit sequence; and in response to determining that the received bit sequence matches the transmitted bit sequence, setting the per-electrical lane delays to delay values that resulted in the matching.

19. A system for transmitting and coherently detecting data transmitted over electrical lanes that experience different amounts of skew, the system comprising:

a traffic generation or forwarding device;

transmit-side components of the traffic generation or forwarding device for generating data to be transmitted to a network device, spreading, using one of the transmit-side components, the data to be transmitted over a first number of electrical lanes, multiplexing the data from the electrical lanes onto a second number of optical lanes, the second number being different from the first number, and transmitting the data to the network device over the optical lanes; and receive-side components of the traffic generation or forwarding device for receiving data from the network device and for reconstructing transmitted data from the received data, wherein the transmit and receive-side components are configured to self calibrate to account for skew between electrical lanes and to set per-electrical lane delays based on the calibration, wherein self calibrating the transmit and receive-side components includes calibrating the receive-side components to account for skew between electrical lanes after a link fault.

20. The system of claim 19 wherein calibrating the receive-side components includes using link fault signaling in data received after a link fault to calibrate the receive-side components.

21. The system of claim 20 wherein using link fault signaling to calibrate the receive-side components includes:
   adding delays on a per electrical lane basis at the receive-side components to the data received after the link fault;
   attempting to detect link fault signaling in the data received after the link fault at the receive-side components;
   in response to detecting link fault signaling, setting the per-electrical lane delays to delay values that resulted in successful detection of the link fault signaling; and
   in response to failing to detect the link fault signaling, changing the delays at the receive-side components and reattempting to detect the link fault signaling.

22. The system of claim 13 wherein the first number of electrical lanes is ten, the second number of optical lanes is four, and transmitting the data to the network device over the optical lanes includes transmitting the data over four 25 gigabit Ethernet optical lanes.

23. The system of claim 13 wherein the first number of electrical lanes is ten, the second number of optical lanes is four, wherein transmitting the data to the network device over the optical lanes includes transmitting the data over four 12.5 gigabit optical lanes, and wherein detecting the data includes assembling the 12.5 gigabit optical lanes into a stream of 50 gigabit Ethernet data.

24. The system of claim 19 wherein the traffic generation or forwarding device comprises non-test device.

25. A non-transitory computer readable medium having stored thereon executable instructions that when executed by the processor of a computer control the computer to perform steps comprising:
   in a traffic generation or forwarding device:
      self calibrating transmit and receive-side components of the traffic generation or forwarding device to account for skew between electrical lanes and setting per-electrical lane delays based on the calibration;
      generating data to be transmitted to a network device;
      spreading, using one of the transmit-side components, the data to be transmitted over a first number of electrical lanes;
      multiplexing the data from the electrical lanes onto a second number of optical lanes, the second number being different from the first number;
      transmitting the data to the network device over the optical lanes;
      receiving data from the network device; and
      reconstructing transmitted data from the received data using the receive-side components, wherein the traffic generation or forwarding device comprises a network equipment test device and wherein the network device comprises a device under test.

* * * * *